Figure 1:
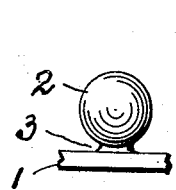

No. 884,496. PATENTED APR. 14, 1908.
A. KILSTROM.
PIN AND PIN JOINT.
APPLICATION FILED SEPT. 3, 1907.

WITNESSES.
Charles T. Hannigan
Howard A. Lamprey

INVENTOR.
Axel Kilstrom
By Warren R. Perce
Attorney.

UNITED STATES PATENT OFFICE.

AXEL KILSTROM, OF PROVIDENCE, RHODE ISLAND, ASSIGNOR TO DAVID M. WATKINS AND FREDERICK H. WATKINS, OF PROVIDENCE, RHODE ISLAND, COPARTNERS AS D. M. WATKINS & COMPANY.

PIN AND PIN-JOINT.

No. 884,496.      Specification of Letters Patent.      Patented April 14, 1908.

Application filed September 3, 1907. Serial No. 391,125.

*To all whom it may concern:*

Be it known that I, AXEL KILSTROM, a citizen of the United States, residing at Providence, in the county of Providence and State of Rhode Island, have invented certain new and useful Improvements in Pins and Pin-Joints, of which the following is a specification, reference being had therein to the accompanying drawings.

Like reference numerals indicate like parts.

Figure 2:
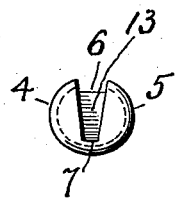
Figure 3:
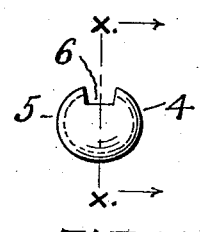
Figure 4:
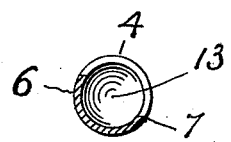
Figure 5:
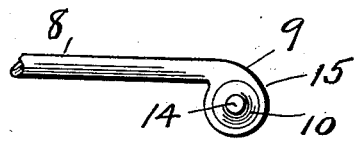
Figure 6:
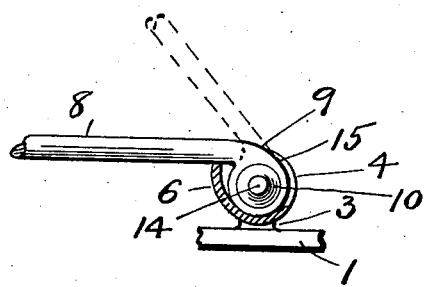
Figure 7:
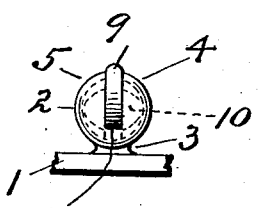
Figure 8:
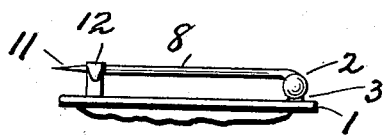

Figure 1 is a side elevation of my improved pin joint. Fig. 2 is a rear elevation of the same. Fig. 3 is a front elevation. Fig. 4 is a view of the pin joint as seen partly in elevation and partly in section on line $x$ $x$ of Fig. 3, and illustrates the interior construction thereof as seen on said line in the direction indicated by the arrows in Fig. 3. Fig. 5 is a side elevation of the pin tongue. Fig. 6 is a side elevation of the pin tongue with its head and pivot mounted in the pin joint, the latter being shown in section as in Fig. 4. Fig. 7 is a rear elevation of the pin tongue mounted in the pin joint. Fig. 8 is a view in side elevation illustrating a brooch provided with my improved pin joint and pin tongue, together with a catch to engage the pointed end of the pin tongue.

My invention relates to pin joints and pin tongues for brooches and similar articles of jewelry, and it consists of the novel construction and combination of the several parts as described and claimed.

In the drawing 1 represents the back plate or brooch, upon which my improved pin and joint are mounted. The pin joint 2 is secured to the plate 1 by solder indicated at 3. The pin joint when completed with the pin head mounted therein is substantially spherical or globular in form as seen in Figs. 1, 7 and 8. This pin joint 2 is a jeweler's finding and is a new article of manufacture. It is supplied to the trade in the form represented in Figs. 2 and 3 for use by manufacturing jewelers. It is in one piece of metal, cut, struck up and shaped by die action and comprises the two concavo-convex, approximately-hemispherical portions or cups 4 and 5, the fulcrum 6 and stop or base 7, all integral.

The pin tongue 8 is a cylindrical tempered wire having a flattened head 9. The pin head 9 has two opposite and eccentrically located hubs or pivots 10, represented in solid lines in Figs. 5 and 6 and in dotted lines in Fig. 7. These hubs or pivots 10 are preferably integral with the pin head 9, being formed thereon by dies. The pin tongue 8 has the usual pointed end 11, which engages the pin catch 12.

After the pin joint 2, has been soldered at 3 to the plate or brooch 1, the pin tongue is mounted therein as follows. The joint 2 when so attached is in the open position illustrated in Figs. 2 and 3, in which, as there seen, the two hemispheric portions 4 and 5 are spread apart at a small angle, the portion 5 being bent away from the part 4, thus opening a space considerably wider than the width of the pin head 9, so that the hubs or pivots 10 can be inserted by properly tipping the pin tongue 8. When both hubs or pivots 10 have been so inserted in the concavities 13, the hemispherical portion 5 is bent by pliers or other suitable tool toward the hemispherical portion 4, thus inclosing and accurately centering the hubs or pivots 10 in the concavities 13 of said hemispherical portions 4 and 5 and the two circular edges thereof then extend parallel to each other in contact with the plane faces of the pin head 9, as illustrated in Fig. 7. The parts 4 and 5 of the pin joint 2 are then symmetrical and together complete the spherical or globular form. By the said tool action when the cupped portion 5 is bent toward the cupped portion 4, the forward or fulcrum portion 6 is slightly crimped outwardly, as seen in Fig. 6, so that the fulcrum edge is moved a little farther from the pin head 9 after said bending than before, which is a better position for the fulcrum action upon the pin tongue.

The outer ends of the hubs or pivots 10 are truncated, as shown at 14, and thus reduce friction within the pin joint 2, as is apparent in Fig. 7. The under part of the pin tongue 8 adjacent to the head 9, when the pin tongue 8 is in the position shown in Fig. 8, rests and bears upon the edge of the forward part 6, which serves as a fulcrum for putting the pin tongue 8 under the necessary tension to forcibly engage with the pin catch 12, when the pin tongue 8 is sprung thereunder by forcing it toward the plate or brooch 1. When the pin tongue is moved to the position indicated by dotted lines in Fig. 6, the eccentric cam surface 15 on the edge of the pin head 9 comes into contact with the stop or edge 7 on the rear portion (near the bottom) of the pin joint 2, and so prevents the pin tongue from opening at too great an angle from the plate or brooch 1. The pin tongue 8 in moving from the position shown in solid lines in Fig. 6 to the position shown by dotted lines in said figure (or in the reverse direction) moves in the space between the parallel edges of the two hemispherical portions 4 and 5 of the pin joint 2, as best shown in Fig. 7, and is confined thereby to a direct vertical line of oscillation.

The comparatively great area and size of the hub-shaped pivots 10 in the engaging interior concave surfaces of the pin joint 2 enable the pin tongue 8 to withstand lateral strain and pressure. The pin joint is therefore very strong and enduring and is not liable to breakage or injury, while its spherical shape gives it a pleasing appearance. As the pin joint is made of a single piece of metal and is cupped up in the peculiar manner shown and described it is more durable and retains its shape, and its closure against the flattened head of the pin tongue is superior and satisfactorily maintained in long continued and even severe usage.

The method described of closing the pin joint to the flattened head of the pin and the general globular form of said joint prevents the marring of the joint by the tool, as is common in the usual construction, and leaves the surface thereof fair and smooth. This pin joint being round does not catch upon the lace of the collar upon which the brooch is used.

I claim as a novel and useful invention and desire to secure by Letters Patent:—

The improved pin and pin joint herein described, consisting of the combination of the pin stem 8, having the flattened head 9, and the cam edge 15; the two pivots 10 extending in alinement on the opposite sides of the head 9, respectively, each pivot having the truncated surface 14 and the spherical curvatures as shown: the two concavo-convex cups 4 and 5, approximately hemispherical in form with an intervening slot between them, in which slot the flattened head 9 of the pin tongue is capable of a limited oscillatory movement in contact with the edges of said slot; and a fulcrum edge 6 and a base or stop 7 connecting said cupped portions, said cups, fulcrum and stop portions being integral, and said fulcrum edge having a radius exceeding the radius of the ball.

In testimony whereof I affix my signature in presence of two witnesses.

AXEL KILSTROM.

Witnesses:
WARREN R. PERCE,
HOWARD A. LAMPREY.